UNITED STATES PATENT OFFICE.

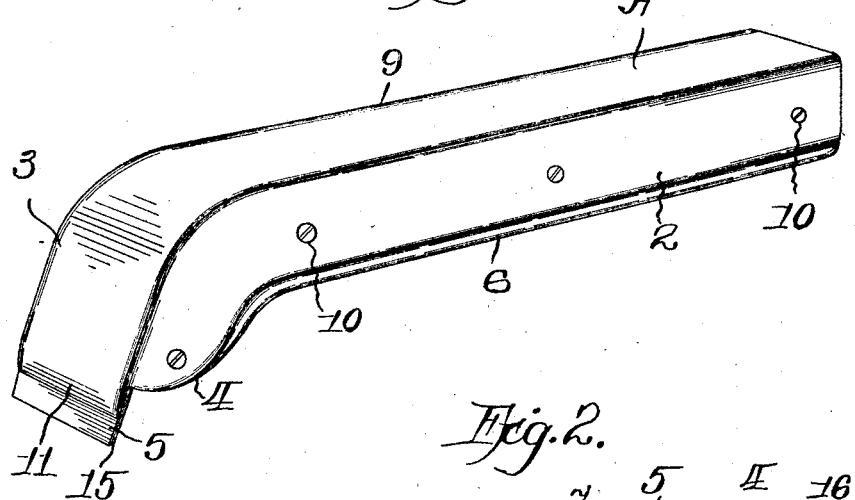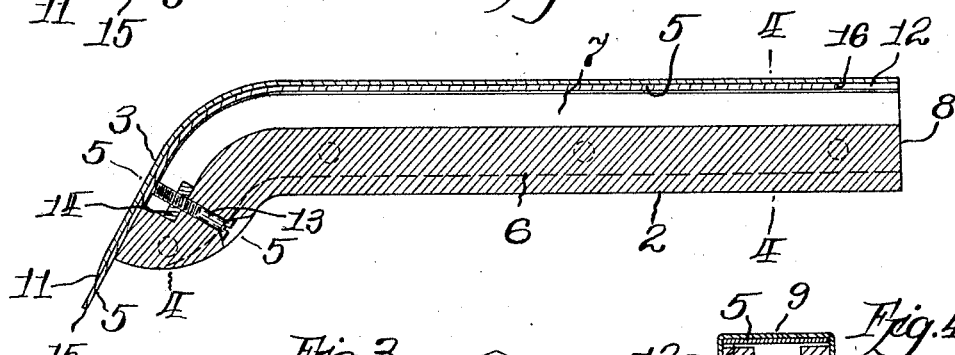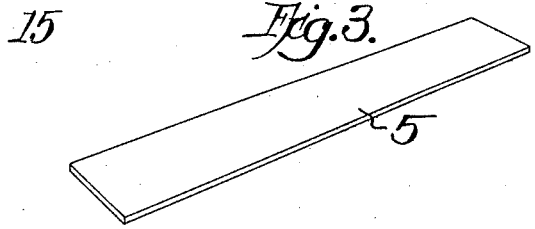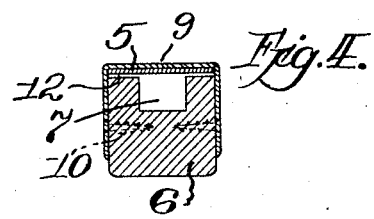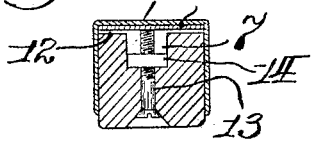

CHARLES GOTTSCHALK, OF ST. PAUL, MINNESOTA.

SCRAPER.

1,327,155.  Specification of Letters Patent.  Patented Jan. 6, 1920.

Application filed May 24, 1919. Serial No. 299,455.

*To all whom it may concern:*

Be it known that I, CHARLES GOTTSCHALK, a citizen of the United States, residing at St. Paul, in the county of Ramsey and State of Minnesota, have invented a new and useful Improvement in Scrapers, of which the following is a specification.

This invention relates to a scraper, which is designed, primarily, to scrape wood to give a finished, smooth surface to the same so that it can be varnished or otherwise protected and finished, as may be desired. This scraper is designed to be operated by hand and is of a convenient size and shape to be held so that it can be freely operated in close quarters, being simple in construction to give an inexpensive, practical device.

The body portion of the scraper constitutes a handle and a receptacle for receiving a thin, steel blade, which can either be entirely contained in the scraper to protect the same, or projected sufficiently to be used as a cutting means to scrape various surfaces smooth. The scraping edge of the steel blade is sharpened so as to cut freely and it is very desirable to have a device which is capable of protecting the cutting edge of the blade when the scraper is not in use. The invention further provides a device in which a long steel blade can be carried so that as the blade wears off in use and from being sharpened from time to time, it can be adjusted and projected by degrees until practically the entire blade has been used up.

In the drawing forming part of the specification:

Figure 1 is a perspective view of the scraper, as it would appear ready for use.

Fig. 2 is a longitudinal central cross section of the same.

Fig. 3 is a perspective view of the steel blade used in the scraper.

Fig. 4 is a cross section on the line 4—4 of Fig. 2.

Fig. 5 is a cross section on the line 5—5 of Fig. 2.

The scraper A is formed with an elongated, approximately rectangular shaped handle portion 2 and a downwardly, curved forward portion 3, the scraper A being practically symmetrical throughout its length. The forward curved end 3 of the scraper extends at an angle from the body portion 2, having its lower surface rounded off at 4 to conveniently expose a portion of the steel cutting blade 5 and to leave sufficient space below the forward end 3 of the scraper so that when the scraper is in use the shavings will not easily collect below the scraping end of the same, and the forward end 3 curving downward sufficiently at the desired angle, so as to leave sufficient room below the handle or body portion 2 for the knuckles of the hand engaging the scraper.

The inner portion 6 of the scraper A is formed of wood or other suitable material to give a device which is comparatively light in weight, and is formed with a longitudinally extending channel or recess 7, which extends from the rear end 8 of the handle or body portion 2 into the curved forward end 3. The inner portion 6 of the scraper A is provided with a channel shaped cover 9, of thin metal, or other suitable material, which is held in place to the member 6 by the screws 10 positioned on either side of the same so as to cover the longitudinal channel 7 and the upper portion of the member 6, the cover extending over the curved forward end and having a downwardly projecting flange 11 of the said width as the top of the scraper A and approximately the same width as the blade 5, to form a projecting shoulder to support and brace the scraping or cutting end of the blade 5, which projects a short distance below the flange 11.

The spring steel blade 5 can be of any suitable gage metal and when of a thin nature, the flange 11 forms a material advantage in bracing the projecting end of the blade 5 from the handle of the scraper A to rigidly hold the same in place and to allow it to be projected far enough to scrape freely when in use. The blade 5 is ordinarily of a straight, flat nature, as illustrated in Fig. 3, and is preferably of approximately the same width as the distance between the inside of the side flanges of the cover 9 so that the blade 5, when inserted in the scraper A, is held freely slidable between the sides of the cover 9 and between the cover and the inner portion 6 in the passageway 12, but is curved through the forward end 3 so as to hold the same with sufficient friction to adjust it in place and preventing it from slipping or sliding too freely in the scraper A. The spring nature of the blade 5 causes it to tend to straighten itself and thus holds the body portion of the same in the passageway 12 above the longitudinal recess 7 and engaging against the inner surface of the top of the cover 9.

A set screw 13 is positioned in the forward end 3 of the scraper A, the threaded end of which engages a burr 14, which is held in the forward end of the channel or recess 7 against rotation so that when the head of the set screw 13 is engaged with a screwdriver, or other suitable tool, it can be turned into engagement with the surface of the blade 5 to engage the blade and clamp it rigidly in place in the scraper A. By means of this set screw, when the blade 5 is adjusted in the scraper A it can be rigidly held in place against movement with a portion projecting beyond the flange 11 and which portion will act as a scraping or cutting edge when properly sharpened to scrape wood surfaces, or other surfaces where it is desired to smooth the same for various purposes. As the cutting edge 15 of the blade 5 wears off, the blade can be sharpened in any suitable manner and again used for scraping.

When the scraper A is not in use, the blade 5 can be pushed back into the body and handle portion of the scraper A, after the set screw 13 has been disengaged from the blade to allow it to move freely in the passageway 12. In this manner, the cutting blade 5 can be entirely inclosed and the cutting edge 15 protected against injury when the scraper A is not in use and thus eliminating any danger of injuring the cutting edge of the blade. This feature is very important in a device of this nature.

The recess or channel 7 allows the rear end 16 of the blade 5 to be engaged from the rear end of the handle 2 by any suitable tool to push the blade 5 out of the forward end of the scraper A when the set screw 13 is disengaged from the blade. In this manner the blade can be freely projected to the desired position and then rigidly held in place by the set screw 13.

The scraper A is of a very convenient design, having a smooth contour from end to end, without any projecting parts to catch or injure the hands of the operator when it is in use. This is a very important feature in a practical scraper, as it is undesirable to use a scraper which has any portions projecting from the same to catch or injure the hand of the user, all sides of this scraper being smooth and the thin, flat scraping blade only projecting sufficiently for operation. This construction allows the body or rear end of the scraper to be engaged with one hand while the forward curved end can be engaged by the other hand to give sufficient grip with the hands on the scraper to allow it to be drawn over a surface with considerable force to cause it to cut freely. If there are any projecting portions on the scraper body or handle when force is applied to the same they would be very apt to be in the way or injure the hands. This design entirely overcomes this disadvantage.

The corners of the handle and cover of the scraper A are rounded sufficiently to give a smooth gripping surface for the hand and the shape of the scraper is such that it can conveniently be held and operated, it being obvious, however, that the curved forward end 3 can be extended at any desired angle from the handle portion 2 so as to hold the cutting edge 15 at the desired angle in relation to the handle. It has been found in practical use that an angle of about 60 to 75 degrees is very desirable, but the angle can be increased or decreased in various styles of scrapers, without departing from the principles of this invention. The device is simple in construction, inexpensive to manufacture and using practically the entire steel blade 5, without removing the same, before a new blade is required. The peculiar shape of the scraper allows a long steel blade to be contained conveniently therein.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim—

1. A scraper having an elongated body portion, a forward, downwardly curved end, a flexible spring cutting blade adjustably held in said scraper, means for rigidly clamping said blade in place, and a longitudinal recess allowing the rear end of said blade to be engaged for adjusting the same in said scraper to various positions therein.

2. A hand scraper, including an elongated, symmetrical body portion, a forward, downwardly curved end extending at an angle from said body portion, a flexible cutting blade, means for clamping said blade in said forward end against movement therein, said blade extending into the body portion of said scraper and being approximately the same width as the body and handle portion of said scraper.

3. A hand operated scraper, including an elongated, rectangular, symmetrical body portion, a channel shaped cover, a head portion extending at an angle from said body portion, a flexible cutting blade, means for holding said blade projecting from said head portion with the body portion of said blade concealed beneath and extending along the inner surface of said cover and means for clamping said blade in cutting position or releasing it so as to conceal said blade beneath said cover in said body portion.

4. A scraper, comprising an elongated, symmetrical handle portion, a thin, flat flexible blade, which is normally straight, means for frictionally holding said blade in said handle portion with a portion of the same extending at an angle to the remainder of said blade, clamping means for rigidly holding said blade with a portion exposed in cutting position and concealing the remainder of the blade in said handle portion and a recess extending through said handle portion to allow the rear end of said blade to be engaged to force the same out of said handle portion when said clamping means is released.

5. A scraper having means for holding an elongated, rectangular shaped, thin, flat, flexible cutting blade with its body portion concealed in the handle portion of said scraper and the cutting edge exposed from or concealed in said handle portion, said exposed end of said blade being adapted to extend at an angle to said handle and body portion of said blade when in cutting position and means for rigidly supporting and bracing the exposed portion of said cutting blade.

6. A scraper, including, a handle portion, a thin, flexible cutting blade, a recess for holding said blade bent with its cutting end at an angle to the remainder of said blade, means for concealing the entire blade in said handle portion, a recess extending through said handle to allow said blade to be engaged and ejected and means for rigidly clamping said blade in said handle with its cutting portion exposed or with said blade concealed in said handle portion to protect the cutting edge thereof.

7. A hand scraper having a rectangular handle body portion with smooth engaging sides and means for adjustably holding and concealing a thin, flat, flexible cutting blade in said body portion for the purposes specified.

8. A scraper having an elongated body portion with smooth engaging sides means for holding a thin, flat, scraping blade in said scraper with its rear end concealed in said body portion and a recess, whereby the rear end of said blade can be engaged to force its scraping end out of said scraper when the scraping end has worn off and when the holding means is released to allow said blade to slide in said scraper.

CHARLES GOTTSCHALK.